United States Patent [19]

Watts

[11] 4,355,628
[45] Oct. 26, 1982

[54] ILLUMINATED SOLAR ENERGY COLLECTOR

[75] Inventor: Ralph M. Watts, Little Rock, Ark.

[73] Assignee: John W. Lowery, Jacksonville, Ark.

[21] Appl. No.: 343,780

[22] Filed: Jan. 29, 1982

[51] Int. Cl.³ .................... F24J 3/02; F21V 33/00
[52] U.S. Cl. .................... 126/427; 126/438;
126/440; 126/450; 126/451; 362/92; D26/68
[58] Field of Search ............. 126/450, 451, 417, 443,
126/440, 438, 449, 427; 240/100; 362/92, 253,
363; D48/36

[56] References Cited

U.S. PATENT DOCUMENTS

| | | | |
|---|---|---|---|
| 761,596 | 5/1904 | Moss | 126/438 |
| 2,213,894 | 9/1940 | Barry | 126/443 |
| 2,291,534 | 7/1942 | Deppe | 126/451 |
| 3,182,654 | 5/1965 | Culling | 126/451 |
| 3,363,618 | 1/1968 | Dominguez | 126/427 |
| 3,934,573 | 1/1976 | Dandini | 126/443 |
| 4,038,971 | 8/1977 | Bezborodko | 126/438 |
| 4,043,315 | 8/1977 | Cooper | 126/438 |
| 4,048,982 | 9/1977 | Pei | 126/450 |
| 4,056,093 | 11/1977 | Barger | 126/440 |
| 4,057,048 | 11/1977 | Maine | 126/440 |
| 4,111,184 | 9/1978 | Fletcher | 126/451 |
| 4,116,223 | 9/1978 | Vasilantone | 126/440 |
| 4,136,670 | 9/1979 | Davis | 126/450 |

*Primary Examiner*—Daniel J. O'Connor
*Attorney, Agent, or Firm*—Stephen D. Carver

[57] ABSTRACT

Solar collector apparatus equipped with self-contained illumination means. The apparatus comprises a generally spherical collector forced from upper and lower hemispherically shaped halves coupled together. A generally spirally wound heat exchange disposed interiorly of the collector at the center thereof warms a fluid with solar energy. A mirror disposed below the heat exchanger reflects solar energy toward it to improve efficiency. Incandescent lights disposed below the mirror within the spherical collector may be actuated to provide an aesthetically pleasing and useful lighting effect.

5 Claims, 4 Drawing Figures

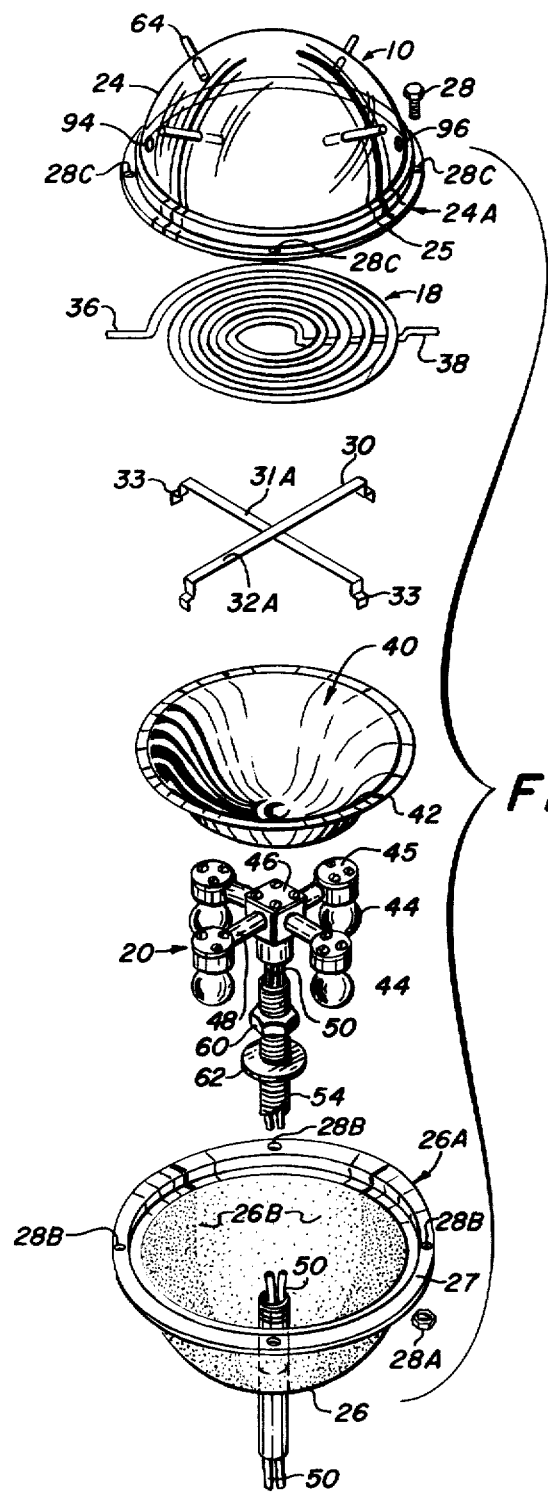
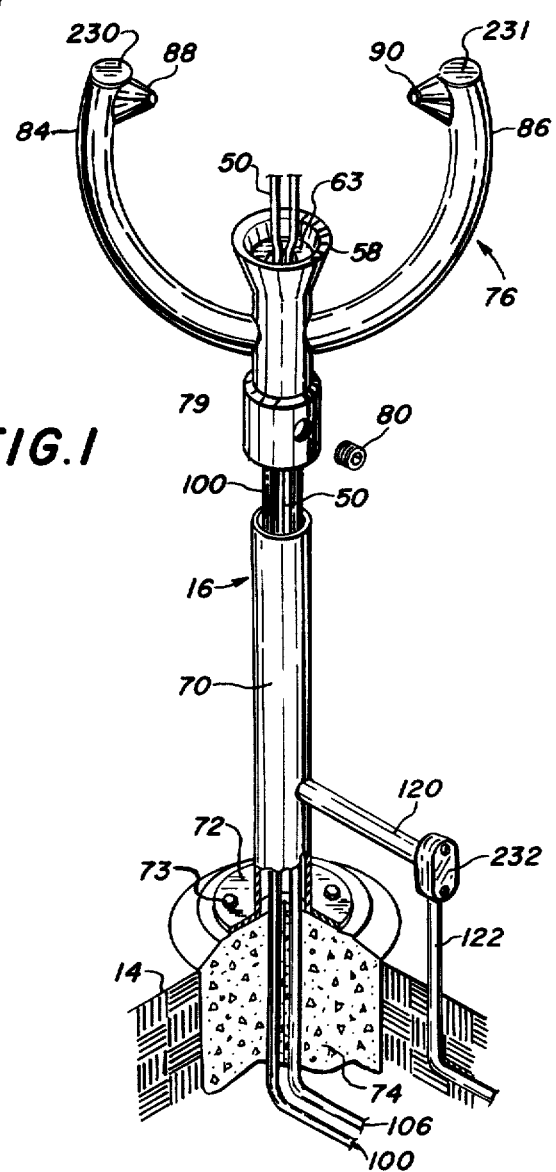
FIG.1
FIG.2

ILLUMINATED SOLAR ENERGY COLLECTOR

CROSS REFERENCE TO RELATED APPLICATION

This is a substitute application for Ser. No. 85,036, filed Oct. 15,1979,now abandoned.

BACKGROUND OF THE INVENTION

This invention relates to solar energy devices. More particularly, this invention is concerned with a unit which employs solar energy to heat a fluid during the day, which unit will function as an ornamentally attractive and functionally useful lighting system during the night.

In the prior art a plurality of solar collectors including some form of enclosure comprised of generally translucent sides and housing some form of tube or coil for heat exchanging are well known. As will be appreciated by those skilled in the art, most solar collectors are generally "flat" or rectangular. Thus prior art devices must be aimed at the sun for maximum efficiency. Usually this means that a compromise position is reached for stationary installations facing generally south (in the northern hemisphere). Alternatively, it has been known in the past to provide some form of automatic tracking means whereby such flat collectors may be continuously aimed at the apparently moving sun.

Besides the problems relating to solar tracking, prior art solar collectors have been somewhat aesthetically unattractive. Moreover, most solar energy collectors known to me are of very little usefulness at night.

SUMMARY OF THE INVENTION

The present invention comprises a generally spherical solar collector adapted to be exposed to sunlight for warming a fluid passing therethrough. The device may thus be used for preheating water for a residential water heater, for example. During periods of darkness illumination means within the collector may be actuated to provide a useful lighting effect.

Preferably the apparatus comprises a spherical collector consisting of upper and lower hemispherical shaped halves which are coupled together to house the internal parts of the apparatus. The spherical collector is rigidly mounted to a pedestal so that it will be secured above ground. A generally spirally wound heat exchange tube enclosed within the apparatus received a working fluid to warm same from solar energy. A mirror located beneath the heat exchanger focuses energy toward it to increase efficiency. Below the mirror within the spherical collector unit a conventional electric lighting system is employed. The lighting system may be actuated at night to provide an ornamentally pleasing outdoor light, for example, and it is capable of use in a variety of other lighting applications.

Because of the generally spherical shape of the collector the unit will be constantly aimed at the sun. Thus tracking problems characteristic of certain prior art collectors are obviated. Moreover, the spherical shape avoids aesthetic objections usually directed at conventional flat solar collector units.

Thus an object of this invention is to provide an energy saving solar collection unit of aesthetically pleasing characteristics.

Another object of this invention is to provide a solar collector unit which, while being aesthetically pleasing, will be of utilitarian merit both at night and in the day.

It is a feature of this invention that the apparatus may be illuminated at night to provide a useful lighting function.

Another object of this invention is to provide a solar collector device of the character described which will be inherently aligned with the sun, thus avoiding tracking or aiming problems typically characteristic of prior art devices.

Another object of this invention is to provide a solar energy collector unit which will be extremely resistant to winds and other natural elements. It is a feature of this invention that the generally spherical shape reduces susceptibility to wind damage.

Another object of this invention is to provide a solar energy collector unit which will be inherently protected against otherwise deleterious accumulation of ice, snow, moisture or the like. It is a feature of this invention that the self-contained illuminating feature generates enough heat to prevent the build-up of ice, snow or moisture.

These and other objects and advantages of this invention, along with features of novelty appurtentant thereto, will appear or become apparent in the course of the following description.

BRIEF DESCRIPTIONS OF THE DRAWINGS

In the following drawings, which form a part of the specification and which are to be construed in conjunction therewith, and in which like reference numerals have been employed throughout to indicate like parts in the various views:

FIG. 1 is an exploded, isometric view of the invention showing the construction of the generally spherical collector;

FIG. 2 is an isometric view of the support pedestal preferably employed to mount the invention with parts thereof broken away or shown in section for clarity;

DETAILED DESCRIPTION OF THE DRAWINGS

Figure 3:
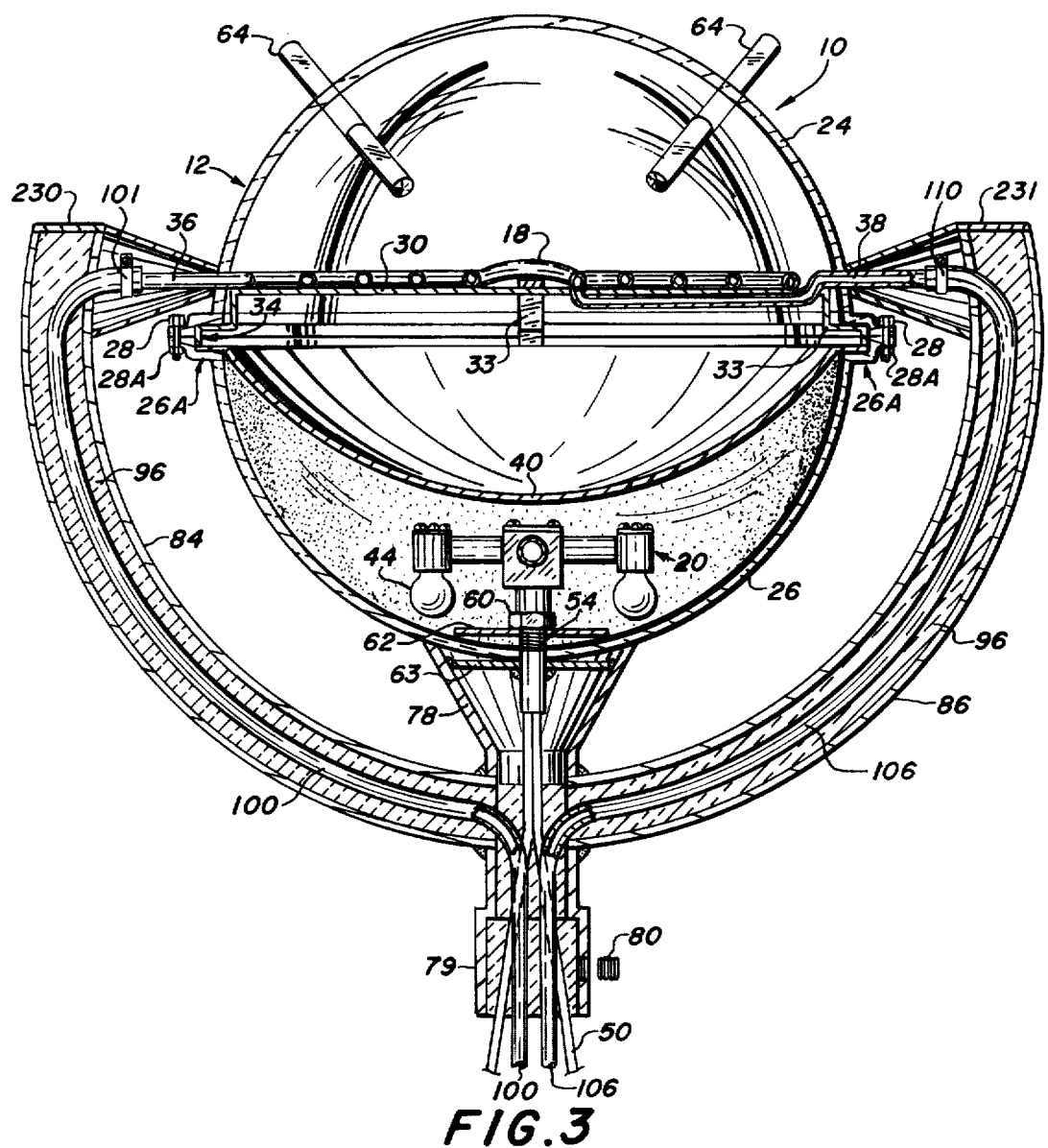
FIG. 3 is an enlarged, assembled sectional view of the invention, with parts thereof broken away or shown in section for clarity; and, FIG. 4 is a block diagram illustrating one manner in which the present invention may be usefully employed.

Turning now to the drawings, and more particularly to FIGS. 1 through 3 thereof, the reference numeral 10 generally designates an illuminated solar collector constructed in accordance with the teachings of the present invention. The solar collector 10 comprises an upper, general spherical collector unit 12 which is adapted to be mounted above a supporting surface 14 (FIG. 2) via a vertical pedestal 16 or similar mount. The apparatus is adapted to be mounted, for example, in the front or back yard of a residence in an area exposed to sunlight. During the daytime a heat exchange coil 18 within the apparatus will warm a fluid circulating therethrough, thus utilizing solar energy advantageously. Coil 18 may, for example, preheat water to be inputted into a hot water heater, thereby saving energy. Also, during the night or an otherwise darkened condition lighting apparatus 20 disposed within the spherical collector 12 may be actuated to provide both ornamental lighting of the collector unit 10 and useful lighting of the surrounding area.

The spherical collector 12 preferably comprises upper and lower generally hemispherically shaped halves 24, 26 which are adapted to be matingly coupled together. It will be noted that each of the halves 24, 26 respectively defined about their bases. The invention may be coupled together through nut and bolt assemblies 28, 28A adapted to be secured through flat flang lip portions 25, 27.

The inside surface 26B of the lower hemisphere 26 may preferably be frosted so as to more fully distribute light through the apparatus to produce a pleasing aesthetic affect at night when illuminated.

The heat exchanger coil 18 is of generally spirally shaped configuration, and is adapted to be disposed within the collector 12 generally at the center thereof. To this effect, a cross braced support means 30 is secured in place between the two hemispheres. It will be noted that support means 30 comprises a pair of generally elongated cross pieces 31A, 32A which terminate in generally step-shaped feet 33. With reference now to FIG. 3, it will be observed that the step-shaped feet portions 33 are matingly received and held in abutment within the rectangular space 34 defined between the flanges 24A, 26A. The heat exchange means 18 includes a pair of ends 36, 38 which may be utilized for the input and output of a working fluid. A preferably aluminum or highly polished parabolic mirror structure 40 is disposed within the collector 12 below the heat exchanger 18. It will be observed that the flanged edge 42 of the mirror is secured within space 34 in abutment with support brace legs 33. Thus mirror 34 and heat exchanger 18 are ultimately held in place by fastening of the upper and lower hemispherical halves. The function of mirror 40 is to concentrate and reflect energy toward the heat exchange 18 thereby increasing the efficiency of the apparatus.

A conventional preferably incandescent lighting system 20 is disposed beneath the mirror 40 and secured with the lower recesses of lower hemisphere 26. The incandescent lighting system includes a plurality of radially spaced-apart incandescent light bulbs 44 mounted in recepticles 45, which are coupled to a conventional electrical junction 45 through conduit 48. Electrical conductors 50 of conventional construction lead to remote switching apparatus (not shown) for actuation of the incandescent bulbs 44 in the usual manner. The lighting fixture 46 is secured within the lower hemisphere 26 to an elongated, threaded sleeve 54 which extends through a recess provided in the lower hemisphere and is weldably secured to the flared pedestal collar 58. Thus when nut 60 is tightened against washer 62 the apparatus will be secured above pedestal 16.

As observed in FIGS. 1 and 3 a plurality of generally cylindrical, elongated stick lenses 64 are provided in penetrating engagement with respect to upper hemisphere 24. The stick lenses are of conventional construction and are available from Bausch and Lomb. The function of lenses 64 is to concentrate or direct energy toward the heating coil 18 so as to raise or lower temperature a desired amount. In this manner, for example, the apparatus working fluid may be varied, and different temperature ranges may be accommodated. Of course magnifying lenses of alternative configurations may be employed.

Pedestal 16 includes an elongated, vertical sleeve-like shaft 70 which is adapted to be coupled to a mounting plate 72 secured through nuts 73 to a concrete foundation 74 provided within the ground 14. Upper arm structure 76 projects from collar 58, which includes sleeve portion 79 thereof which is adapted to be matingly coupled to the upper edge of shaft 70. Sleeve 79 is permanently secured to shaft 70 with a set screw 80. A pair of generally C-shaped mounting arms 84, 86 project outwardly from collar 58, terminating in generally cone-shaped projections 88, 90, which are adapted to penetrate holes 94, 96 respectively provided within upper hemisphere 24. In this manner the mounting arms 76 will firmly and sealingly support the spherical collector.

It will be best observed in FIG. 3 that the mounting arms 84, 86 are of generally tubular, arcuate construction. The arms are preferably filled with a polyurethane insulative substance so as to prevent thermodynamic losses. A fluid conduction tube 100 provided in arm 84 is adapted to be coupled to the fluid input means 36 of the heat exchanger with a clamp 101. Similarly, fluid output tube 106 is coupled to the fluid output 38 with a clamp 110. It will be observed that the fluid input and output means 36, 38 comprising the ends of heat exchanger 18 are adapted to be physically outputted through the upper hemisphere through the holes 94, 96 and into mounting projections 88, 90. Conduits 100, 106 thus extend downwardly within arms 84, 86, into pedestal sleeve 70, from which they extend to an application such as a water heater or the like. The electrical conductors 50 providing power to the apparatus may be conducted through sleeve 54 into pedestal collar 58 and downward through sleeve 70. Then the conductors 50 may pass through a conduit 120, 122 for switching inside the residence or other facility at which the invention is installed.

It will be observed that during operation heat or solar energy passing through the preferably glass or acrylic spherical collector 12 will be reflected by mirror 40 toward heat exchanger 18. A fluid, such as water, passing through coil 18 will thus be warmed. At night, it will be apparent that lighting of the bulbs 44 will produce desirable lighting effects. For example, the apparatus itself will be illuminated, providing desireable aesthetic characteristics and also providing illumination of nearby areas. It will be observed that heat generated by the lighting apparatus will rise upwardly, vertically through the apparatus where it will warm the spherical collector and thus prevent the build-up of snow or ice. Also, it will be apparent that the heat generated by the incandescent bulbs will eliminate or drive off moisture which might otherwise collect within the device. Since the collector is spherical it will be apparent that wind resistance will be reduced so that the apparatus will resist high winds. Furthermore, it will be apparent that the collector remains properly aimed at the sun as long as it is properly installed.

Figure 4:
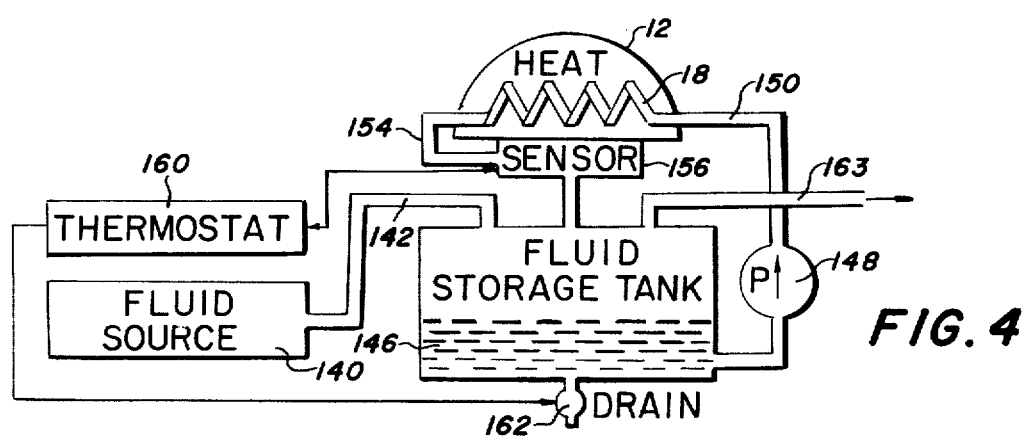

Turning now to FIG. 4, one possible application of the invention is illustrated. Conventional fluid source 140 may deliver fluid through a conduit 142 to a storage tank 146. A pump 148 in fluid flow communication with tank 146 may drive fluid through conduit 150 into the heating coil 18 disposed within the collector 12. Warmed water or fluid may thus be outputted through a conduit 154 past sensor 156 back into the storage tank 146. Sensor 156 may be employed to control thermostat 160 to actuate drain 162 to output warmed fluid at a given temperature range. Also, hot water or hot fluid may be drawn off in the usual manner from conduit 163. It is contemplated, for example, that in residential applications the invention 10 may find primary application in preheating water going to conventional electric or fossil fuel water heaters. Because of the obvious aesthetic beauty of the device, it will be apparent that many of the conventional limitations of solar energy collectors will be overcome. Also, it will be apparent that the device will perform very useful lighting effects at night.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. An illuminated solar energy collection unit comprising:
   a generally spherical collector adapted to be exposed to sunlight, said collector comprising upper and lower generally hemispherically shaped, flanged halves adapted to be coupled together;
   heat exchange means disposed within said spherical collector substantially at the center thereof for warming fluid passing therethrough with solar energy, said heat exchange means including fluid input means and fluid output means;
   means for supporting said heat exchange means within said collector, said supporting means including at least a portion thereof secured between said flanged collector halves;
   mirror means disposed within said collector for reflecting solar energy toward said heat exchange means;
   lighting means disposed interiorly of said collector for selectively providing illumination, said lighting means disposed between said mirror means and a lowermost portion of said collector whereby heat generated by said lighting means will warm the collection unit thereby resisting build-up of the moisture and accumulation of snow, ice and the like; and,
   pedestal means adapted to be disposed upon a supporting surface for securely mounting said collector at an elevated position above said surface.

2. The combination as defined in claim 1 wherein:
said pedestal is tubular;
said collector is secured to said pedestal means via generally C-shaped, tubular mounting means; and
said heat exchange means fluid input means and fluid output means extend through said mounting means and said pedestal means for connection exteriorly of said collection unit.

3. The combination as defined in claim 2 including a plurality of adjustable lenses extending interiorly of said spherical collector for facilitating internal temperature control.

4. The combination as defined in claim 3 including generally C-shaped mounting arm means for supporting said spherical collector.

5. The combination as defined in claim 4 wherein said heat exchange means is of generally spirally shaped configuration.

* * * * *